United States Patent [19]

Binder

[11] 4,314,514
[45] Feb. 9, 1982

[54] SUGAR CANE PLANTER

[76] Inventor: Johann V. Binder, Cardier Rd., Wangan, Queensland, Australia, 4860

[21] Appl. No.: 131,008

[22] Filed: Mar. 17, 1980

[51] Int. Cl.³ .............................................. A01C 7/20
[52] U.S. Cl. ...................................................... 111/3
[58] Field of Search ................................. 111/2, 3, 34

[56] References Cited

U.S. PATENT DOCUMENTS

| 1,726,139 | 8/1929 | Blasco et al. | 111/3 X |
| 3,907,135 | 9/1975 | Populin et al. | 111/3 X |
| 3,943,862 | 3/1976 | Populin et al. | 111/3 |
| 4,047,631 | 9/1977 | Diz | 111/3 X |
| 4,204,491 | 5/1980 | Quick | 111/3 |
| 4,266,490 | 5/1981 | Haines et al. | 111/3 |
| 4,275,669 | 6/1981 | Atkinson | 111/3 |

FOREIGN PATENT DOCUMENTS

| 208892 | 5/1957 | Australia | 111/2 |
| 261238 | 8/1965 | Australia | 111/2 |
| 457279 | 8/1979 | Australia | 111/3 |

Primary Examiner—James R. Feyrer
Attorney, Agent, or Firm—Schwartz, Jeffery, Schwaab, Mack, Blumenthal & Koch

[57] ABSTRACT

A sugar cane planter includes a main frame which may be hitched to the rear of a tractor and is supported by adjustable depth wheels, a drill plough for opening a furrow being mounted under the main frame. A trailer frame, mounted on wheels and connected pivotally about a transverse axis to the main frame carries a hopper for a bulk supply of cane setts and a tank for fungicidal liquid, into which the can setts pass gravitationally from the hopper. An elevator elevates the setts from the tank and discharges them into a chute leading to the furrow opened by the drill plough. The hopper bottom can be tilted to promote the gravitational passage of setts to the tank.

4 Claims, 2 Drawing Figures

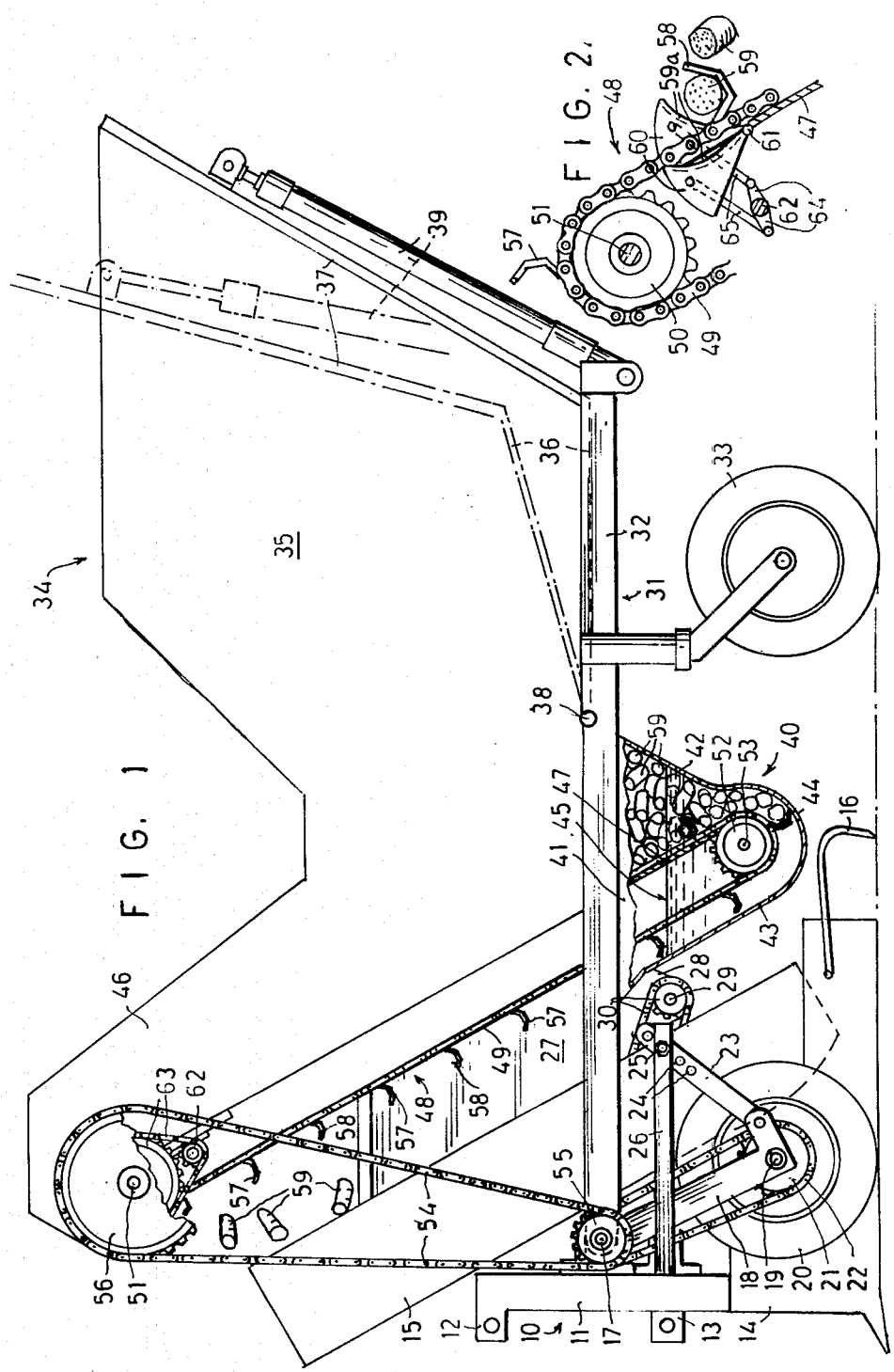

SUGAR CANE PLANTER

BACKGROUND OF THE INVENTION

This invention relates to a sugar cane planter.

The main object of the invention is to provide a cane planter of the type which plants setts which have been pre-cut, by a chopper harvester for example, the planter being particularly compact and simple and economical to manufacture, though highly effective in operation.

BRIEF SUMMARY OF THE INVENTION

A cane planter according to the invention has a wheel-mounted main frame which can be hitched to a tractor, a drill plough for opening a furrow in which the cane setts are to be planted being mounted under the main frame. A wheel-mounted trailer frame, pivotally connected about a transverse axis at its front to the main frame, carries a hopper capable of receiving a quantity of cane setts, and a tank for fungicidal or other treating liquid, the setts passing gravitationally from the hopper into the tank, from which an elevator elevates and discharges them into a chute assembly, through which the setts are fed gravitationally to a furrow opened by the drill plough. Other features of the invention will become apparent from the following description.

BRIEF DESCRIPTION OF THE DRAWINGS

A preferred embodiment of the invention is shown in the accompanying drawings, wherein:

FIG. 1 is a partly broken-away side elevational view of a sugar cane planter according to the invention, and FIG. 2 is a detail drawing, to enlarged scale, showing the throw-out mechanism of the elevator of the planter.

DETAILED DESCRIPTION OF THE PREFERRED EMBODIMENT

The cane planter shown in the drawings includes a main frame 10 having at its front an A-frame 11, with a pair of apertured lugs 12 at its top, and two pairs of apertured side lugs 13, these parts being made and arranged for connection to a tractor's three-point linkage (not shown).

A drill plough 14 of generally conventional type is mounted centrally under the main frame. A main chute 15 mounted on the main frame inclines downwardly and rearwardly, its lower end being located between the sides of the drill plough. Rakes 16 are provided in usual manner for closing a furrow opened by the drill plough.

A rotatable transverse counter-shaft 17 is journalled in bearings secured on the front part of the main frame 10. This counter-shaft serves as a pivot for a pair of wheel mounting brackets 18, the upper ends of which are provided with bearings in which the counter-shaft 17 is rotatable, the lower ends of the brackets, which incline rearwardly and downwardly, being provided with bearings for the axles 19 of a pair of depth wheels 20. The axle of at least one of the depth wheels also carries a sprocket 21, connected by an endless chain 22 to a sprocket (not shown) on the counter-shaft 17. Associated with each of the wheel mounting brackets 18 is a depth adjustment arm 23, pivoted at its front and lower end to the lower part of the bracket, its upper part being formed with a series of holes 24, any selected one of which may be engaged by a bolt 25 passing through a bracket 26 on the main frame, so that the working height of the main frame, relative to the depth wheels, may be readily adjusted.

Two fertilizer distributors 27 (one of which is omitted from the drawing for clarity) are mounted on the main frame, one on each side of the main chute 15. Each of these fertilizer distribuors is of well known type, including a hopper of which the front and back are downwardly convergent to a transverse tubular worm housing 28, a transverse worm shaft 29 coaxially rotatable in the housing carrying a worm device (not shown) for conveying fertilizer received gravitationally in the housing to a discharge outlet from the bottom thereof. The worm shaft 29 is driven by a chain and sprocket drive 30 from the counter-shaft 17.

The counter-shaft 17 serves as a pivot for the front of a trailer frame 31 having a pair of rigidly interconnected side members 32 with bearings at their front to receive this shaft, the rear end of the trailer frame being supported by a pair of castor wheels 33.

A large cane hopper 34 is mounted on the trailer frame, and includes a pair of fixed parallel side plates 35, and a bottom plate 36 and back plate 37. The bottom and back plate are secured rigidly to each other, and the two are pivotally movable about a transverse axis at 38, at the front of the bottom plate 36, moving closely between the parallel fixed side plates 35. The bottom amd back plates may be pivotally moved upwards and forwards from normal position, shown in full outline, to a discharging position, indicated in broken outline, by means of a hydraulic cylinder 39 pivoted to the rear of the trailer frame 31, its piston being pivoted to the back plate 37.

The movable bottom plate 36 of the hopper leads, at its front, to the rear of a tank 40. This tank comprises a pair of parallel side plates 41 substantially co-planar with the fixed side plates 35 of the hopper, and which may be made integrally therewith, and rear and front plates 42 and 43 downwardly convergent to a substantially semi-cylindrical bottom 44. The tank 40 contains a quantity of fungicidal liquid 45 for the treatment of cane setts.

The front parts of the hopper sides 35 are extended upwardly and forwardly to constitute the upper sides 46 of an elevator casing including also an elevator bottom plate 47 which extends down into the tank.

The elevator 48 is of twin type, including three endless chains 49 mounted on three sprockets 50 on a transverse shaft 51 at the head of the elevator casing and on three corresponding sprockets 52 on a bottom shaft 53 through the tank 40. The elevator is driven by an endless chain 54 from a sprocket 55 on the counter-shaft 17 to a sprocket 56 on the top elevator shaft 51. The elevator has two sets of transverse channel-shaped cleats 57 and 58, of perforated metal, the cleats 57 being mounted on the middle and one side chain 49 of the elevator, the cleats 58 being mounted on the middle and the other side chain, all of the cleats 57 and 58 being in equally spaced staggered arrangement.

The hopper 34 is capable of receiving a large quantity of cane setts 59 to be planted, and a number of these pass gravitationally into the tank 40 for immersion in the treating liquid 45, the level of which is maintained from a reservoir (not shown) on the tractor. As the tractor advances, the main frame 10 is lowered to working position, the furrow plough opens a furrow and the elevator 48 is driven from the counter-shaft 17, which in turn is driven from one or both of the depth wheels 20. The elevator cleats 57 and 58 are carried down through the tank 40, and on their upward travel each picks up at least one cane sett 59 from the tank 40, in which it has been immersed in the treating liquid, and carries it upwardly to the head of the elevator. If any one of the cleats should pick up an extra sett, to lie on top of a sett in the channelled cleat, the superfluous sett will be discharged near to the top of the elevator by an ejector device, to fall back into the hopper or tank. The ejector device, shown particularly in FIG. 2, includes a pair of curved throw-out plates 59 each with two forwardly extending side plates 60, the two throw-out plates 59 being pivoted adjacently about a transverse axis at 61, at the bottom of openings in the elevator bottom plate 47. Each throw-out plate is located between two succeeding elevator chains 49, so one is aligned with the cleats 57, the other with the cleats 58. The two throw-out plates are oscillated, so that first one, and then the other, is swung rearwardly between a pair of the chains 49, by means of a double-cranked shaft 62 driven by a chain and sprocket drive 63 from the top elevator shaft 51, the two cranks 64 of the shaft 62 being oppositely directed, and connected by connecting rods 65 to the two throw-out plates 59. The parts are so made and arranged that as each of the cleats 57 approaches the head of the elevator, any superfluous sett thereon will be ejected by one throw-out plate 59, which is then retracted to permit the cleat to pass, the other throw-out plate 59 acting similarly to eject any superfluous sett from the following cleat 58, and so on.

The cane setts 59, then, are discharged, one at a time, from alternate sides of the head of the elevator, and at a rapid rate of feed. The setts fall into the main chute 15, which is shaped so that the setts, entering the top of the chute more or less transversely, are caused to turn, in passing through the chute, so that they leave the bottom of the chute and enter the furrow in end to end disposition.

To maintain the flow of cane setts into the tank 40, the hydraulic cylinder 39 is operated, from the tractor's hydraulic system, to tilt the hopper bottom plate 36 and back plate 37. The hopper, then, may carry a considerably greater quantity of cane setts than would be the case if its bottom were permanently inclined.

The planter is particularly compact, owing to the straight-through feed of setts from the hopper 34 to the treating tank 40 from which they are elevated and discharged through the main chute 15 to the furrow. At the same time, the planter is capable of receiving a considerable quantity of the cane setts, and it will elevate and discharge only setts which have been treated in the tank, superfluous setts which may be picked up by the cleats being returned to the hopper or tank by the ejector mechanism without any likelihood of setts being jammed or damaged. The operation of the planter is stopped as soon as the depth wheels 20 leave the ground, on the lifting of the main frame 10 by the tractor's three-point linkage.

If desired, the main chute 15 may be so constructed as to feed setts from the two sides of the twin elevator into two separate furrows opened by a pair of furrow ploughs 14 mounted side by side below the main frame, and preferably in laterally adjustable manner so that the spacing of the two furrows may be varied. With appropriate modifications, the two ploughs may be spaced for two row planting, in which case two separate chutes 15 may be provided, each receiving setts from one side of the elevator.

I claim:

1. A sugar cane planter including:
a wheel-mounted main frame,
means for connecting the main frame to a tractor,
a drill plough mounted under the main frame,
a wheel-mounted trailer frame pivotally connected about a transverse axis at its front to the main frame,
a fixed tank adapted to contain a quantity of treating liquid on the trailer frame, said tank including side walls and downwardly convergent front and rear walls which define a closed tank bottom,
a hopper on the trailer frame adapted to carry a quantity of cane setts and to deliver them gravitationally into the tank, said hopper comprising a pair of fixed parallel sides and, between the sides, a bottom member hinged at its front to the back of the tank and a back member rigidly secured to the back of the bottom member, and means for raising the bottom and back members relative to said fixed sides and tank for ejecting cane setts from the hopper into the tank,
an elevator extending into said tank to elevate setts from the tank and to discharge them above the main frame, said elevator including transverse channelled cleats on endless sprocket-mounted chains, each of said cleats being adapted to engage and elevate at least one sett, and means for ejecting from each of said ascending cleats any setts carried by said cleat in excess of one, and
a chute assembly on the main frame adapted to receive such discharged cane setts and feed them gravitationally to a furrow opened by the drill plough.

2. The planter of claim 1 wherein said ejecting means comprises a pivoted throw-out member mounted adjacent the head of the elevator, and means for oscillatting the throw-out member to move it sequentially over each ascending cleat to eject therefrom any sett in excess of one carried by the cleat.

3. A sugar cane planter according to claim 1 wherein said elevator has three parallel endless sprocket-mounted chains and two series of said cleats in staggered arrangement, those of one series being mounted transversely on the middle and one side chain, those of the other series being mounted transversely on the middle and the other side chain, all of the cleats being in substantially equally spaced arrangement, and wherein a throw-out member is provided for each of said series of cleats.

4. The planter of claim 1 wherein the front and rear walls are inclined more steeply than said bottom member of said hopper, even when said bottom member is raised, said front and rear walls of said tank converging into a semi-cylindrical bottom wall into which the bottom of said elevator extends for conveying cane setts from said tank.

* * * * *